3,227,740
PREPARATION OF ALKYL CARBONATES
Donald M. Fenton, Anaheim, Calif., assignor to Union Oil Company of California, Los Angeles, Calif., a corporation of California
No Drawing. Filed Feb. 25, 1963, Ser. No. 260,844
13 Claims. (Cl. 260—463)

This invention relates to a method for the preparation of dialkyl carbonates which are useful for a variety of purposes including solvents, and poly(alkylcarbonates) useful as plasticizers, oils, etc.

I have found that such dialkyl carbonates and polycarbonates can be readily prepared by the reaction of an alkanol or polyol and carbon monoxide in the presence of a solution of mercuric salts in an organic solvent. The crude reaction products comprise the alkyl carbonate or poly(alkyl carbonate), mercury and the acid corresponding to the anion, of the mercuric salt employed. The dialkyl carbonate or poly(alkyl carbonate) is readily recovered from the crude reaction product and the remaining materials subjected to known oxidizing conditions to oxidize the mercury to the mercuric salt for recycling to the reactor.

The reaction is operated at relatively mild conditions, e.g., temperatures between about 30° and about 300° C. and pressures from atmospheric to about 500 atmospheres. While the presence of slight amounts of water can be tolerated, the yields are decreased in its presence and, therefore, the reaction is preferably conducted under anhydrous conditions.

The reactant alcohol can be any desired primary alcohol corresponding to the particular alkyl carbonate to be synthesized. Generally, alicyclic and aliphatic primary monohydroxy alcohols having from 1 to about 25 carbons can be employed to prepare the dialkyl carbonates, e.g., methanol, ethanol, propanol, butanol, isobutanol, amyl alcohol, isoamyl alcohol, hexanol, isohexanol, cyclohexanol, heptanol, isoheptanol, cycloheptanol, 3-methylhexanol-1, lauryl alcohol, 3,4-diethylheptanol-1, 4-ethylcyclohexanol, etc. Preferably, low molecular weight alcohols having 1 to about 6 carbons are used.

The dialkyl carbonate prepared corresponds to the alkyl group of the particular alcohol employed, thus the use of methanol results in the production of dimethyl carbonate, ethanol to diethyl carbonate, propanol to dipropyl carbonate, butanol to dibutyl carbonate, cyclohexanol to dicyclohexyl carbonate, etc. Mixtures of two or more alcohols yield corresponding carbonates, e.g., methanol and ethanol when employed as the reactants yield a mixture of dimethyl carbonate, diethyl carbonate, and methyl ethyl carbonate, etc.

The poly(alkylcarbonate) products are prepared by subjecting a glycol or aliphatic polyol to the hereindescribed reaction conditions. Glycols yield generally linear polymers whereas the various polyols yield, of course, cross-linked polymers having a diversity of properties. To illustrate, any of the following glycols can be used as reactants: ethylene glycol, trimethylene glycol, 1,2-propylene glycol, 1,2-butylene glycol, 1,3-butylene glycol, tetramethylene glycol, pentamethylene glycol, 1,2-pentylene glycol, 1,3-pentylene glycol, hexamethylene glycol, 1,2-hexylene glycol, 1,3-hexylene glycol, 1,4-hexylene glycol, dipropylene glycol, carbitol, glycerol methyl ether, glycerol ethyl ether, diethylene glycol, etc.

The poly(alkylene oxide) polymers can also be employed as a convenient source of glycols. Particularly useful are polyoxyethylene, polyoxypropylene, as well as block polymers of ethylene oxide and propylene oxide. These diols are commercially available in a variety of forms and degrees of polymerization. Examples of commercially available diols are the various Pluronics manufactured by Wyandotte Chemicals.

Various polyols can also be used alone or in admixture with any of the aforementioned alkanols and glycols to impart cross-linking to the polymer. Examples of suitable polyols are the various triols such as: glycerol, pentaglycerol, erythritol, pentaerythritol, adonitol, arabitol, hexanhexol, etc. Alkylene oxides, e.g., propylene and ethylene oxide, can be condensed on any of the aforementioned polyols to provide high molecular weight reactants. Examples of such are the polyoxyethylene glycerol ether, polyoxypropylene glycerol ether, etc. Another suitable high molecular weight polyol is commercially available in the Tetronic series of Wyandotte Chemicals. These tetraols comprise blocks of polymers of propylene and ethylene oxides and are prepared by condensing propylene oxide on an alkylene diamine and thereafter condensing ethylene oxide on the intermediate product. Products having molecular weights from about 1000 to 10,000 or more are available in this series.

Preferably, the polyols are used in combination with glycols and/or monohydroxyl reactants to limit the degree of cross-linking and thereby permit facile recovery of the product in accordance with conventional practice in the alkyd polymer art.

The reaction medium can be any organic solvent which is liquid at the reaction conditions and which is inert to the reactants, i.e., inert to carbonates, carbon monoxide, mercury salts and/or alcohol. The particular alcohol employed as a reactant can be used in excess and thus comprise the reaction solvent. This is the preferred embodiment since it simplifies the product recovery steps. If desired, however, other organic solvents can be employed including various ethers such as: methyl ethyl ether, diethyl ether, diisopropyl ether, dichloroethyl ether, ethylene glycol diisoamyl ether, ethylbenzyl ether, diethylene glycol diethyl ether, triethylene glycol diethyl ether, tetraethylene glycol dimethyl ether, etc.

Various esters can also be employed as the solvent, e.g., methyl formate, ethyl formate, methyl acetate, ethyl acetate, n-propyl formate, isopropyl acetate, ethyl propionate, n-butyl formate, sec-butyl acetate, isobutyl acetate, ethyl n-butylate, n-butyl acetate, isoamyl acetate, n-amyl acetate, glycol diformate, furfurol acetate, isoamyl n-butyrate, ethyl acetyl acetate, diethyl oxalate, glycol diacetate, isoamyl isovalerate, methyl benzoate, ethyl benzoate, methyl salicylate, n-propyl benzoate, n-butyl oxalate, etc.

The saturated hydrocarbons can of course be used as a suitable inert solvent, e.g., pentane, hexane, heptane, octane, decane, dodecane, benzene, toluene, xylene, kerosene, etc.

The mercuric salts which can be employed are those soluble in the reaction medium. Included in such salts are the mercuric halides and the carboxylates of the lower molecular weight carboxylic acids, e.g., mercuric chloride, mercuric bromide, mercuric fluoride, mercuric acetate, mercuric formate, mercuric propionate, mercuric butyrate, mercuric pentonate, etc. Of these, mercuric acetate is preferred.

The reaction is believed to proceed through two steps, and is exemplified by the following:

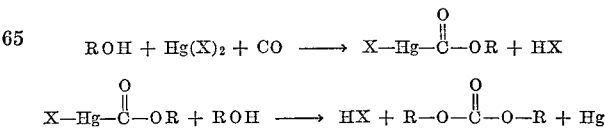

wherein:
X represents the particular anion of the mercuric salt, e.g., the aforementioned halide or carboxyl groups.

As previously mentioned, the preferred embodiment comprises the use of mercuric acetate with the resultant production of acetic acid in the crude reaction product.

The reaction can be performed in a single step by introducing the reactants, i.e., carbon monoxide, the alcohol and mercuric salt into a reaction zone at the desired temperature, about 150° to about 350° C. and desired pressures from about 10 to about 1000 p.s.i.g. Preferably temperatures from about 200° to about 250° C. and pressures from 50 to about 500 p.s.i.g. are used.

Because mercuric salts are reactive with alcohols at elevated temperatures, it is preferred to perform the reaction in separate steps. In the first step, the solution is treated to saturation with carbon monoxide and the alcoholic or organic solution of the resultant mercuric carbonate is thereafter heated to the necessary reactive temperature to form the dialkyl carbonate or poly(alkylcarbonate). In this manner the competing reaction between the alcohol and the mercuric salt is avoided and the desired carbonate formation is favored.

In general, temperatures between about 0° and about 100° C. can be used in the first step to absorb carbon monoxide; preferably temperatures from about 25° to about 75° C. are used. High pressures are preferred to favor absorption of carbon monoxide, generally pressures from about 10 to about 1000 p.s.i.g. can be used, preferably between about 100 and about 500 p.s.i.g. are used.

The length of the primary carbon monoxide absorption step depends on the degree of contacting achieved between the liquid and gas. The necessary length of time is readily determinable by observing when carbon monoxide is no longer absorbed as reflected by, e.g., achieving a steady reaction pressure or any other indication that a portion of the gas phase is no longer being absorbed.

Thereafter, the reactants are heated to the necessary temperature to yield the carbonate product. Generally, temperatures between about 150° and about 350° can be used; between about 175° and 225° C. are preferred.

The crude reaction product is readily decanted to separate the organic products from the mercury, the former are distilled to recover the carboxylic acid and the desired yield of alkyl carbonate from the solvent employed. The solvent and acid, e.g., acetic, can be combined with the mercury and the mixture subjected to oxidizing conditions to oxidize the mercury to its soluble salt for recycling to the reaction. Various known oxidizing conditions can be employed in this step, e.g., nitric acid, chromic acid, parmanganates, ozone, can be employed together with oxygen under temperatures between about 0° C. and about 250° C. to reoxidize the mercury for recycling.

The following examples will serve to illustrate a mode of practicing my invention:

*Example 1*

Dibutyl carbonate was prepared by the reaction of 100 milliliters of n-butanol and 31 grams of mercuric acetate in a 300 milliliter bomb, which was pressurized to 400 p.s.i.g. with carbon monoxide. The mixture was then heated to 50° C. in a rocking apparatus. After two hours at 50° C., the pressure dropped to 300 p.s.i.g. The mixture was then heated to 110° C. and held at this temperature for two hours and, finally, heated to and maintained at 220° C. for an additional two hours. On cooling, the pressure returned to 300 p.s.i.g. The bomb was opened and the product contained therein found to comprise two liquid layers, the lower comprising 19 grams of mercury. The upper yellow layer was decanted and distilled to recover 2 milliliters of butyl acetate, boiling point 120°–130° C., 0.6 grams water and 12 grams dibutyl carbonate, having a density of 1.4108 and a boiling point 74°–75° C. at 4 mm. pressure. An infrared spectrum indicated the sample to be very pure dibutyl carbonate which was obtained in a 67% yield.

*Example 2*

Dimethyl carbonate was prepared in the same apparatus by the reaction of 100 milliliters methanol, 32 grams mercuric acetate and 21 milliliters toluene as a solvent. The bomb was pressured to 400 p.s.i.g. with carbon monoxide, heated, with rocking, to 50° C. for one hour, then 100° C. for one hour and finally, 200° C. for two hours. After cooling, the pressure returned to 300 p.s.i.g. The bomb was opened and contained 20 grams of mercury and a yellow-green liquid which was added to 100 milliliters water. The organic phase was distilled and a high yield of dimethyl carbonate was recovered therefrom.

*Example 3*

The 20 grams mercury from Example 2 was added to 150 milliliters acetic acid containing 2 milliliters concentrated nitric acid. Air was introduced into the mixture and a white solid immediately was formed. The mixture was heated and at 80° C. (1 hour later) the maximum amount of white solid had formed and the metallic mercury had disappeared. Further heating to 105° C. dissolved the white solid and a clear solution was left. Upon cooling, a white precipitate formed which was filtered to obtain 27 grams mercuric acetate which can be used in repeated reactions for the formation of dialkyl carbonates.

*Example 4*

A poly(hexamethylenecarbonate) was prepared by condensing 12 grams of hexamethylene glycol in 100 milliliters of ethyl ether solvent containing 31 grams of mercuric acetate. The solvent, mercuric salt and reactant were charged to a 300 milliliter bomb and pressured to 400 p.s.i.g. with carbon monoxide. The bomb was rocked and heated and maintained at 60° C. for two hours, then heated to and held at 220° C. for two more hours. Upon cooling to room temperature the bomb pressure was observed to be 350 p.s.i.g. The bomb was opened and the contents decanted to separate the organic layer from 15 grams of mercury in the bomb. The solvent and excess hexamethylene glycol were removed from the polymer by vacuum distillation. The liquid residue was a viscous yellow liquid having an infrared analysis of carbonate and hydroxyl groups and a molecular weight of 391.

The preceding examples are intended solely to illustrate my invention and are not to be construed as unduly limiting thereof. My invention is intended to be defined by the method steps and their equivalents set forth in the following claims.

I claim:

1. The synthesis of a carbonate from an alcohol selected from the class consisting of alicyclic and aliphatic primary alcohols having 1 to about 25 carbons and aliphatic polyols having molecular weights from 62 to about 10,000 which comprises contacting said alcohol with carbon monoxide in the presence of a mercuric salt selected from the class consisting of mercuric halides and carboxylates of lower molecular weight carboxylic acids at a temperature between about 150° and about 350° C. and a pressure from about 10 to 10,000 p.s.i.g.

2. The reaction of claim 1 for the preparation of a dialkyl carbonate wherein a monohydroxy alcohol is used as said alcohol.

3. The reaction of claim 1 for the preparation of a poly(alkylcarbonate) wherein an aliphatic polyol containing primary hydroxyls is used as said alcohol.

4. The reaction of claim 1 comprising the use of a mercuric carboxylate of a lower molecular weight fatty acid as said mercuric salt.

5. The reaction of claim 4 comprising the use of mercuric acetate as said mercuric salt.

6. The manufacture of a dialkyl carbonate which comprises absorbing carbon monoxide in a solution containing a mercuric carboxylate of lower molecular weight carboxylic acids and a saturated primary alcohol selected from the class consisting of alicyclic and aliphatic primary alcohols having 1 to about 25 carbons at a temperature between about 0° and about 100° C. and a pressure between about 10 and about 1000 p.s.i.g. until said solution substantially ceases to absorb said carbon monoxide and thereafter heating said solution to a temperature between about 150° and about 350° C. to form said dialkyl carbonate.

7. The manufacture of dialkyl carbonates according to claim 6 wherein said alcohol is a saturated primary alcohol having 1 to about 5 carbon atoms.

8. The manufacture of claim 6 wherein said alcohol has from 1 to about 6 carbons.

9. The manufacture of claim 6 comprising absorbing said carbon monoxide under substantially anhydrous conditions.

10. The manufacture of a poly(alkylcarbonate) which comprises absorbing carbon monoxide in a solution containing a mercuric carboxylate of a lower molecular weight fatty acid and an aliphatic saturated primary polyol having a molecular weight from 62 to about 10,000 at a temperature between about 0° and about 100° C. and a pressure between about 10 and about 1000 p.s.i.g. until said solution substantially ceases to absorb said carbon monoxide and thereafter heating said solution to a temperature between about 150° and about 350° C. to form said poly(alkylcarbonate).

11. The manufacture of claim 10 comprising using mercuric acetate as said mercuric salt.

12. The manufacture of claim 10 comprising the use of a diprimary glycol as the polyol.

13. The manufacture of claim 10 comprising absorbing said carbon monoxide under substantially anhydrous conditions.

References Cited by the Examiner
UNITED STATES PATENTS 2,734,913   2/1956   Reppe et al. _____ 260—488

OTHER REFERENCES

Wagner et al.: Synthetic Organic Chemistry, 1953 Edition.

MURRAY TILLMAN, *Primary Examiner.*

LEON J. BERCOVITZ, *Examiner.*